May 31, 1955 H. E. VAN VALKENBURG 2,709,760
VARIABLE ANGLE ULTRASONIC SEARCH UNIT
Filed March 14, 1952

INVENTOR.
HOWARD E. VAN VALKENBURG
BY
Joseph H. Lipschutz
ATTORNEY

United States Patent Office 2,709,760
Patented May 31, 1955

2,709,760

VARIABLE ANGLE ULTRASONIC SEARCH UNIT

Howard E. Van Valkenburg, Danbury, Conn., assignor to Sperry Products, Inc., Danbury, Conn., a corporation of New York Application March 14, 1952, Serial No. 276,715

12 Claims. (Cl. 310—8.1)

This invention relates to the ultrasonic inspection of solid objects. Various methods have heretofore been employed for such inspection, particularly the method of transmitting wave trains or pulses into the object and measuring the time interval which elapses between the transmission of the pulse and the reception of any reflection thereof from a reflecting surface, such as a fissure, in the object. In connection with this method of testing it has variously been proposed to transmit the wave trains into the object in a direction normal to the entering surface, and in another form in a direction at an angle to normal with respect to said entering surface. It has further been found desirable, in order to scan an interior area of the object, to vary the angle of transmission of the ultrasonic beam into the object to obtain a scanning effect. In connection with the latter method of testing, a number of devices have been proposed whereby a variable angle of transmission can be obtained, but all of these devices rely upon rotating a crystal and its support through a predetermined angle. The construction of such variable angle device was necessarily complicated and frequently expensive because of the precise fitting of parts which was necessary.

It is therefore the principal object of this invention to provide a variable angle search unit which is simple and inexpensive to construct and which involves no rotating parts. More particularly it is the object of this invention to provide a search unit whereby variable angle of transmission and reception of ultrasonic pulses may be obtained by the rectilinear movement of a piezo-electric element.

Further objects and advantages of this invention will become apparent in the following detailed description thereof.

In the accompanying drawings.

Figure 1:
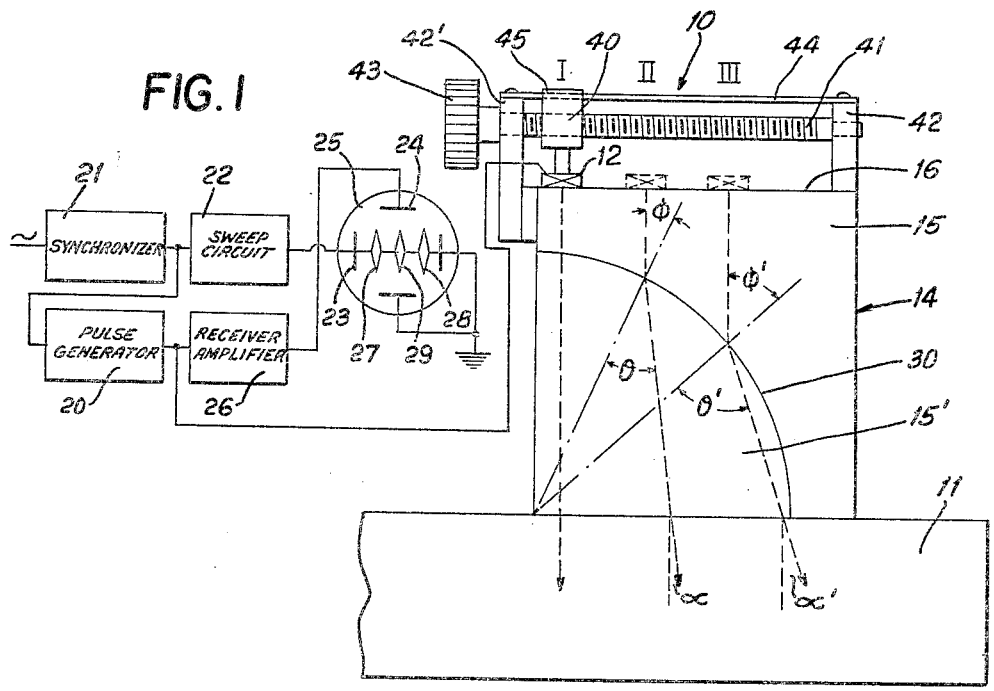
Fig. 1 is a front elevation of a variable angle search unit embodying one form of this invention, and showing electrical wiring.

Referring to Fig. 1, there is shown a variable angle search unit, indicated generally at 10, embodying my invention, said search unit being shown applied to an object which may be a steel plate 11 or the like which is to be inspected ultrasonically for internal defects. The search unit comprises a piezo-electric element 12 which may be in the form of a quartz crystal mounted upon a support indicated generally at 14, in engagement with a flat surface 16 thereof. The crystal may be moved along said flat surface rectilinearly. The crystal is adapted to be energized periodically at ultrasonic frequency to generate ultrasonic wave trains or pulses which are then transmitted through the support and through the entering surface of the object, the support forming an interface with the said entering surface. In order to generate such ultrasonic pulses there may be provided a pulse generator 20 which is adapted to be periodically energized by a synchronizer 21 which in turn may be energized from a suitable alternating current source such as 60 cycle A. C. Sixty times each second therefore the pulse generator will be energized to generate an ultrasonic electric wave train which vibrates the crystal at the said ultrasonic frequency to generate ultrasonic wave trains of the same frequency. At the same time that the pulse generator is energized there may be energized also a sweep circuit 22 for generating a sweep between the horizontal plates 23 of an oscilloscope 25. The pulses which are applied to the crystal are also applied to a receiver amplifier 26 whose output is applied to the vertical plates 24 of the oscilloscope to cause vertical deflection of the horizontal sweep in response to an output from the amplifier. Such output will occur not only when the original pulse is transmitted but also when reflections of said pulse are received from within the object. Thus the first deflection 27 of the sweep may indicate the transmitted pulse, the last deflection 28 may be an indication of the rear surface of the object, while any intermediate deflection 29 will indicate an intermediate reflecting surface within the object, such as a fissure.

The generated pulses thus travel through the support 14 and into the object. If the support were merely a rectangular block the pulses would be transmitted through the block in a direction normal to the entering surface, i. e., at zero angle of incidence. If the support were an angular wedge, as in the patent to Carlin No. 2,527,986 granted October 31, 1950, the transmitted pulse would enter the object at a fixed angle of incidence. However, if a variable angle of incidence is desired, then recourse has heretofore been had to mounting the crystal on a pivotal axis, with the consequent complication and expense. By this invention there is obtained a variable angle of transmission merely by the rectilinear movement of the crystal along the outer surface of the support.

To accomplish the above result the support 14 is formed of a plurality of members instead of being but a single unitary member. Thus, as shown, the support comprises two parts 15 and 15' of different materials, the said parts being closely fitted together along a curved meeting surface 30. This curve may be the arc of a circle, or it may be any other predetermined curve specifically designed to yield predetermined angles of transmission, as will be described hereinafter. For the purposes of illustration I have shown the parts meeting along the arc of a quadrant of a circle. The outer part 15 is made of material having a lower acoustic velocity than the inner part 15'. Therefore when the pulses are transmitted through the outer part into the inner part at an angle of incidence other than normal there will occur refraction of the pulse at an angle which is a function of the acoustic velocities of the parts and the angle of incidence. This is in accordance with the formula:

$$\frac{\sin \phi}{\sin \theta} = \frac{V1}{V2}$$

where $V1$ is acoustic velocity in part 15, $V2$ is acoustic velocity in part 15' and $\phi$ is angle of incidence, and $\theta$ is angle of refraction. It will be seen that the arcuate meeting surfaces of parts 15 and 15' are so positioned that at the left hand end of the support the pulses strike the arc at angle of incidence substantially zero; but as the crystal is moved toward the right the ultrasonic vibrations strike the arc at a progressively increasing angle of incidence, with correspondingly increasing angle of refraction. Therefore whereas in position I the beam enters the object substantially normally, in position II the beam enters the object at an angle a, and in position III the beams enters the object at a greater angle a'. Thus the interior of the object may be scanned from normal to a maximum angle merely by the rectilinear movement of the crystal along the top surface of the support.

Figure 2:
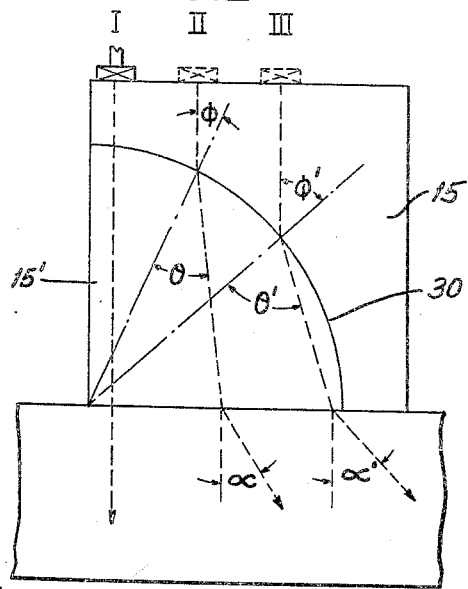
Fig. 2 is a view similar to Fig. 1 showing a modified search unit, the electric wiring being omitted.

As shown in Fig. 1 it is assumed that the acoustic velocity in part 15 is less than the acoustic velocity in part 15', but that the acoustic velocity in part 15' is substantially the same as that of the object 11. However the acoustic velocity of part 15' can be made lower than the acoustic velocity of the object 11 and higher than the acoustic velocity of part 15, in which case, as shown in Fig. 2, a second refraction of the beam will take place on entering the object, thus yielding a larger range of angular variation of transmission with a wider field of scanning for a given search unit.

Figure 3:
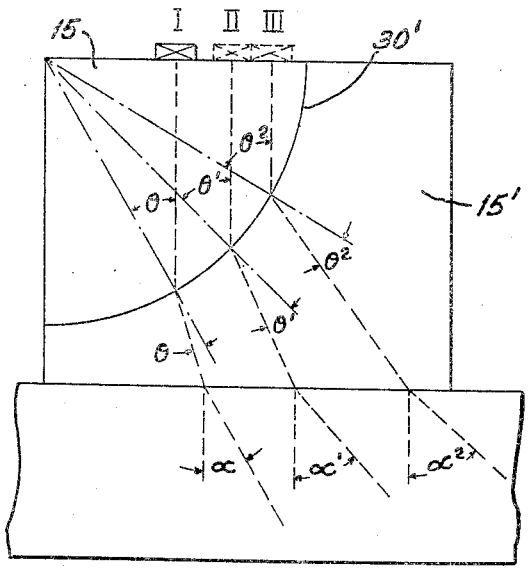
Fig. 3 is a view similar to Figs. 1 and 2 showing another form of the invention.

In Fig. 3 there is shown a modified form of the invention which may be employed where the acoustic velocity in part 15 is greater than the acoustic velocity in part 15'. In such case the meeting surface 30' is a quadrant as in the Fig. 2 form, but the quadrant is so chosen that meeting surface 30' presents a concave front to the transmitted pulses, whereas meeting surface 30 presents a convex surface. The acoustic velocity of the object 11 may be the same as that of part 15', or, as shown, may be of higher acoustic velocity to yield larger angles α, α1, α2.

Any suitable device may be employed for effecting rectilinear movement of the crystal as for instance a slide 40 to which the crystal 12 is attached, said slide being internally threaded to receive a screw 41 which is journaled in support 42, 42' fixed to the crystal support member 15 for rotation without linear movement and is provided with a knurled knob 43 at its other end. The slide is held against rotation by means of a rod 44 also fixed in the support at one end and having its other end extending through a slot 45 in the slide. Therefore rotating the knob in one direction or the other will move the crystal rectilinearly in one direction or the other along the surface of the support.

Having described my invention, what I claim and desire to secure by Letters Patent is:

1. A device for the ultrasonic inspection of an object, comprising a search unit, said unit comprising a piezoelectric crystal and a support therefor, said support having opposed rectilinear surfaces, one of said surfaces being adapted to engage the object, said crystal engaging the other of said surfaces, and means for energizing the crystal at ultrasonic frequency to transmit ultrasonic vibrations through the support and into the object, said support being formed of a pair of members having different acoustic velocities, the meeting surfaces of said members forming a curve, means for moving said crystal on the respective rectilinear surface in a plane including said rectilinear surfaces and said curve, whereby said curve offers a variable angle of incidence to the vibrations transmitted into the support by the crystal as the crystal is moved along the respective rectilinear surface, to transmit ultrasonic vibrations into the object at a varying angle.

2. A device as specified in claim 1, in which the curve formed by the meeting surfaces of said members is of predetermined shape to offer an angle of incidence to the vibrations transmitted into the support by the crystal which varies its magnitude in a predetermined sequence as the crystal is moved along the support.

3. A device as specified in claim 1, in which the curve formed by the meeting surfaces of said members is of predetermined shape to offer an angle of incidence to the vibrations transmitted into the support by the crystal which varies its magnitude continuously in a given direction as the crystal is moved along the support.

4. A device as specified in claim 1, in which the curve formed by the meeting surfaces of said members is an arc of a circle.

5. A device as specified in claim 1, in which the curve formed by the meeting surfaces of said members is a quadrant.

6. A device as specified in claim 1, in which the curve formed by the meeting surfaces of said members presents a convex surface to the transmitted vibrations.

7. A device as specified in claim 1, in which the acoustic velocity of the member engaging the crystal is lower than the acoustic velocity of the member engaging the object.

8. A device as specified in claim 1, in which the acoustic velocity of the member engaging the crystal is lower than the acoustic velocity of the member engaging the object, and the acoustic velocity of the member engaging the object is lower than the acoustic velocity of the object.

9. A device as specified in claim 1, in which the curve formed by the meeting surfaces of said members is a quadrant presenting a convex surfaces to the transmitted vibrations.

10. A device as specified in claim 1, in which the curve formed by the meeting surface of said members presents a concave surface to the transmitted vibrations.

11. A device as specified in claim 1, in which the curve formed by the meeting surfaces of said members presents a concave surface to the transmitted vibrations, and the acoustic velocity of the member engaging the crystal is higher than the acoustic velocity of the member engaging the object.

12. A device as specified in claim 1, in which the curve formed by the meeting surfaces of said members presents a concave surface to the transmitted vibrations, the acoustic velocity of the member engaging the crystal is higher than the acoustic velocity of the member engaging the object, and the acoustic velocity of the member engaging the object is less than the acoustic velocity of the object.

References Cited in the file of this patent

UNITED STATES PATENTS

| | | |
|---|---|---|
| 2,525,873 | Delano | Oct. 17, 1950 |
| 2,527,986 | Carlin | Oct. 31, 1950 |
| 2,602,101 | Mesh | July 1, 1952 |
| 2,602,102 | Webb | July 1, 1952 |

OTHER REFERENCES

Book entitled "Ultrasonics" by B. Carlin, published 1949 by McGraw Hill Book Co., pages 22, 23 and 24.